(12) United States Patent
Schade et al.

(10) Patent No.: US 6,300,441 B1
(45) Date of Patent: Oct. 9, 2001

(54) METHOD FOR THE PRODUCTION OF AN INITIATOR COMPOSITION FOR RETARDED ANIONIC POLYMERIZATION

(75) Inventors: Christian Schade, Ludwigshafen; Wolfgang Fischer, Walldorf; Hermann Gausepohl, Mutterstadt; Stephan Jüngling, Mannheim; Volker Warzelhan, Weisenheim, all of (DE); Michel Fontanille, Talence; Alain Deffieux, Talence-Cedex, both of (FR); Philippe Desbois, Maikammer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,171

(22) PCT Filed: Feb. 5, 1999

(86) PCT No.: PCT/EP99/00771

§ 371 Date: Aug. 14, 2000

§ 102(e) Date: Aug. 14, 2000

(87) PCT Pub. No.: WO99/42491

PCT Pub. Date: Aug. 26, 1999

(30) Foreign Application Priority Data

Feb. 18, 1998 (DE) .............................................. 198 06 772

(51) Int. Cl.[7] .................................. C08F 4/52; C08F 12/08
(52) U.S. Cl. ........................... 526/177; 526/346; 502/153; 502/157
(58) Field of Search ................................. 526/177, 346; 502/153, 157

(56) References Cited

U.S. PATENT DOCUMENTS

| 3,716,495 | 2/1973 | Hsieh . |
| 4,079,176 | 3/1978 | deZarauz . |
| 5,086,136 | * 2/1992 | Takashima et al. .................. 526/177 |

FOREIGN PATENT DOCUMENTS

| 26 28 380 | 12/1976 | (DE) . |
| 234 512 | 9/1987 | (EP) . |
| 98/07765 | 2/1998 | (WO) . |

OTHER PUBLICATIONS

J.Am.Chem.Soc., vol. 82 (1996), pp 6000–6005.

* cited by examiner

*Primary Examiner*—Fred Teskin
(74) *Attorney, Agent, or Firm*—Keil & Weinkauf

(57) ABSTRACT

Disclosed are a process for the preparation of an initiator composition comprising an alkali metal organyl and an aluminum organyl and a process for the polymerization of anionically polymerizable monomers.

8 Claims, No Drawings

METHOD FOR THE PRODUCTION OF AN INITIATOR COMPOSITION FOR RETARDED ANIONIC POLYMERIZATION

The present invention relates to a process for the preparation of an initiator composition comprising an alkali metal organyl and an aluminum organyl and to a process for the polymerization of anionically polymerizable monomers.

Anionic polymerizations typically proceed very rapidly, so that they are difficult to control on an industrial scale owing to the considerable amount of heat generated. Lowering the polymerization temperature results in an excessive increase in viscosity, in particular with a concentrated solution. Reducing the initiator concentration increases the molecular weight of the polymer formed. Controlling the reaction by appropriate dilution of the monomers results in higher solvent requirement and lower space-time yields.

It has therefore been proposed to include in the anionic polymerization initiators various additives to influence the polymerization rate.

The effect of Lewis acids and Lewis bases on the rate of the anionic polymerization of styrene was described in Welch, Journal of the American Chemical Society, Vol 82 (1960), pages 6000–6005. For instance, it has been found that small amounts of Lewis bases such as ethers and amines accelerate the n-butyllithium-initiated polymerization of styrene at 30° C. in benzene, whereas Lewis acids such as zinc and aluminum alkyls reduce the polymerization rate or, when used in superstoichiometric amounts, stop the polymerization completely.

U.S. Pat. No. 3,716,495 discloses initiator compositions for the polymerization of conjugated dienes and vinylaromatics where a more efficient use of the lithium alkyl as initiator is achieved by the addition of a metal alkyl of a metal of group 2a, 2b or 3a of the Periodic Table of the Elements, such as diethyl zinc, and polar compounds such as ethers or amines. The manner in which the individual initiator components are added to the polymerization system is said to be uncritical.

Earlier patent application PCT/EP97/04497, unpublished at the priority date of the present invention, describes continuous processes for the anionic polymerization or copolymerization of styrene or diene monomers using alkali metal alkyl as polymerization initiator in the presence of an at least bivalent element as a retarder.

Various initiator mixtures which may comprise alkali metals, alkaline earth metals, aluminum, zinc or rare earth metals are known, for example, from EP-A 0 234 512 for the polymerization of conjugated dienes with a high degree of 1,4-trans-linking. German Offenlegungsschrift 26 28 380 teaches, for example, the use of alkaline earth aluminates as cocatalyst in conjunction with an organolithium initiator for the preparation of the polymers or copolymers of conjugated dienes having a high trans-1,4-linkage content and low 1,2-linkage or 3,4-linkage contents. This is said to lead to an increase in polymerization rate.

The use of additives such as aluminum alkyls which have a strong retarding effect on the anionic polymerization requires exact dosage and temperature control. A slight underdosage may lead to an insufficient retardation of the reaction rate, whereas a slight overdosage may completely stop the polymerization.

Separate addition, or insufficient mixing-in, of the individual initiator components to a monomer solution may lead to poor dispersion, particularly at high monomer concentrations, and house to different local concentrations of the individual initiator components. Before a homogeneous dispersion of the initiator components can be achieved, the polymerization may already be initiated in some regions, whereas the polymerization is strongly retarded or has not yet started in others. This may lead to large local temperature increases and irreproducible molecular weight distributions.

It is an object of the present invention to provide a process for the preparation of an initiator composition comprising an alkali metal organyl and an aluminum organyl to make it possible to polymerize anionically polymerizable monomers, in particular styrene, in a reproducible manner with respect to polymerization rate and molecular weight distribution.

We have found that this object is achieved by a process for the preparation of an initiator composition comprising an alkali metal organyl and an aluminum organyl, which comprises homogeneously mixing the metal organyls, dissolved in inert hydrocarbons, and aging at a temperature in the range from 0 to 120° C. for at least 2 minutes.

The initiator composition prepared in this manner is particularly useful for the polymerization of anionically polymerizable monomers.

Alkali metal organyls which may be used are mono-, bi- or multifunctional alkali metal alkyls, aryls or aralkyls customarily used as anionic polymerization initiators. It is advantageous to use organolithium compounds such as ethyllithium, propyllithium, isopropyllithium, n-butyllithium, sec-butyllithium, tert-butyllithium, phenyllithium, diphenylhexyllithium, hexamethylenedilithium, butadienyllithium, isoprenyllithium, polystyryllithium or the multifunctional compounds 1,4-dilithiobutane, 1,4-dilithio-2-butene or 1,4-dilithiobenzene. The amount of alkali metal organyl required depends on the desired molecular weight, the type and amount of the other metal organyls used and the polymerization temperature and is typically in the range from 0.0001 to 5 mol percent, based on the total amount of monomers.

Aluminum organyls which may used are those of the formula $R_3Al$, wherein the radicals R are each, independently of one another, hydrogen, halogen, $C_1$–$C_{20}$-alkyl or $C_6$–$C_{20}$-aryl. Preferred aluminum organyls are aluminum trialkyls such as triethylaluminum, triisobutylaluminum, tri-n-butylaluminum, triisopropylaluminum or tri-n-hexylaluminum. Particular preference is given to using triisobutylaluminum. It is also possible to use aluminum organyls which are formed by partial or complete hydrolysis, alcoholysis, aminolysis or oxidation of alkyl- or arylaluminum compounds or those which carry alkoxide, thiolate, amide, imide or phosphide groups. Examples are diethylaluminum N,N-dibutylamide, diethylaluminum ethoxide, diisobutylaluminum ethoxide, diisobutyl-(2,6-di-tert-butyl-4-methyl-phenoxy)aluminum (CAS No. 56252-56-3), methylaluminoxane, isobutylated methylaluminoxane, isobutylaluminoxane, tetraisobutyldialuminoxane, or bis(diisobutyl)aluminum oxide.

The molar ratios of the metal organyls with respect to each other may vary within wide limits, but depend primarily on the desired retardation effect, the polymerization temperature, the monomer composition and concentration and the desired molecular weight.

The molar ratio of aluminum to alkali metal is advantageously in the range from 0.2 to 4.

In the process of the invention, use is made primarily of alkali metal organyls and aluminum organyls and, if desired, magnesium organyls. Barium, calcium or strontium organyls are preferably only present in ineffective amounts not having a significant effect on the polymerization rate or copolymerization parameters. Nor should transition metals or lanthanoids, especially titanium, be present in significant amounts.

The inert hydrocarbon used may be aliphatic, cycloaliphatic or aromatic. Preference is given to using solvents in which the metal alkyls are commercially available in the form of a solution. Particular preference is given to using pentane, hexane, heptane, cyclohexane, ethylbenzene or toluene.

The initiator components are advantageously used in the solution concentrations in which they are commercially available or, for a quicker establishment of equilibrium, in a more diluted form. Preference is given to concentration where the sum of all metal organyls is in the range from 0.01 to 2 mol/l, based on the initiator composition.

The temperature depends on the concentration, the type of the metal organyls and the solvent. It is usually possible to use any temperature between the freezing point and boiling point of the mixture. It is advantageous to use a temperature in the range from 0 to 120° C., preferably in the range from 20 to 80° C.

The aging of the metal organyls is important for their reproducible use in anionic polymerization. Experiments showed that initiator solutions which are mixed separately or just prior to the initiation of the polymerization result in poorly reproducible polymerization conditions and polymer properties. It is believed that the aging process observed is caused by a complexation of the metal organyls which proceeds slower than the mixing process. In the concentration and temperature ranges described above, an aging time of about 2 minutes is usually sufficient. It is preferred to age the homogeneous mixture for at least 5 minutes, in particular at least 20 minutes. However, aging the homogeneous mixture for several hours, e.g. from 1 to 480 hours, is not usually harmful either.

It is also possible in the process of the invention to additionally add styrene. In this case an oligomeric polystyryl anion is obtained with the metal organyls complexed at its chain end. Preference is given to using styrene in an amount in the range from 10 to 1000 mol%, based on the alkali metal organyl.

The initiator components may be mixed in any mixing apparatus, preferably in those which may be pressurized with inert gas. Examples of suitable mixers are stirred tanks equipped with anchor stirrers or shaker containers. Heatable tubes equipped with static mixing elements are particularly suitable for continuous preparation. The mixing process is necessary to mix the initiator components homogeneously. It is possible but not strictly necessary to continue mixing during aging. It is also possible to carry out the aging process in a continuous stirred tank reactor or in a tube section, the volume of which, together with the flow rate, determines the aging time.

The initiator compositions are suitable for the polymerization of anionically polymerizable monomers. The initiator composition is preferably used for the homopolymerization or copolymerization of vinylaromatic monomers and dienes. Preferred monomers are styrene, α-methylstyrene, p-methylstyrene, ethylstyrene, tert-butylstyrene, vinyltoluene or 1,1-diphenylethylene, butadiene, isoprene, 2,3-dimethylbutadiene, 1,3-pentadiene, 1,3-hexadiene or piperylene or mixtures thereof.

The amount of initiator composition required depends on the desired molecular weight, the type and amount of the further metal organyls used in addition to the alkali metal organyl, and the polymerization temperature, and is usually in the range from 0.0001 to 5 mol%, based on the alkali metal organyl content and the total amount of monomers.

The polymerization may be carried out in the presence of a solvent. Suitable solvents are the aliphatic, cycloaliphatic or aromatic hydrocarbons having from 4 to 12 carbon atoms which are generally used for anionic polymerization, such as pentane, hexane, heptane, cyclohexane, methylcyclohexane, isooctane, decalin, benzene, alkylbenzenes such as toluene, xylene, ethylbenzene or cumene or suitable mixtures. Obviously, the solvent must have the high purity which is typically required for the process. The solvents may be dried over aluminum oxide or molecular sieve and/or distilled prior to use to remove protic substances. The solvent from the process is preferably reused after condensation and the abovementioned purification.

It is possible to adjust the retarding effects within wide temperature ranges via the composition and amount of the metal organyls. It is therefore also possible to carry out the polymerization at initial monomer concentrations in the range from 50 to 100% by volume, particularly from 70 to 100% by volume, which lead to highly viscous polymer solutions and require higher temperatures at least at higher conversions.

After the polymerization is completed, the living polymer ends may be capped with a chain terminator. Suitable chain terminators are protic substances or Lewis acids, such as water, alcohols, aliphatic or aromatic carboxylic acids and inorganic acids such as carbonic acid or boric acid.

The target products may be homopolymers or copolymers and mixtures thereof. Polystyrene and styrene/butadiene block copolymers are preferably obtained. The process of the invention may also be used to prepare high-impact polystyrene (HIPS), in which case polybutadiene, styrene/butadiene block copolymers or mixtures thereof may be used as rubbers.

The block copolymers may be coupled using multifunctional compounds, such as polyfunctional aldehydes, ketones, esters, anhydrides or epoxides. The process of the invention may be carried out in any pressure- and temperature-resistant reactors, it being possible in principle to use backmixing or non-backmixing reactors (i.e. reactors having stirred tank or tubular reactor characteristics). Depending on the choice of initiator concentration and composition, the particular process route applied and other parameters, such as temperature and possible temperature profile, the process of the present invention leads to polymers having high or low molecular weight. It is possible to use, for example, stirred tanks, tower reactors, tube reactors and tubular reactors or tube bundle reactors with or without internals. Internals may be static or mobile. The process is preferably carried out continuously.

The initiator compositions prepared according to the process of the invention make it possible to control the polymerization of anionically polymerizable monomers, in particular styrene, very effectively and to achieve reproducible polymer properties.

EXAMPLES:

Preparation of Initiator Solution I1

8 ml of a 1.6-molar s-butyllithium solution (sBuLi) in cyclohexane (from Aldrich) and 6.4 ml of a 1.6-molar solution of triisobutylaluminum (TIBA) in toluene (from Witco) were combined at 25° C. and stirred prior to use for 10 hours.

Example 1

A 2.35 l stirred tank equipped with an anchor stirrer was charged with 800 g of styrene and 200 g of toluene under nitrogen and heated to 85° C. with stirring. On reaching this temperature, initiator solution I1 (molar Li/Al ratio=1/0.85) was added and the polymerization solution was kept at 85° C. The conversion was 29% after 25 minutes. After 60 minutes at 85° C., the polymerization was terminated at a conversion of 52% by adding 4 ml of ethanol. The viscous polystyrene solution obtained had a number average molecular weight $M_n$ of 54,340 g/mol and a polydispersity $M_w/M_n$ of 1.29.

Comparative Experiment 1

Example 1 was repeated, except that the components of initiator solution I1 were combined and added to the monomer solution within less than 1 minute. The polymerization mixture was heated up to 213° C. within 5 minutes.

Example 2

1.5 ml of sec-butyllithium (1.3 M in cyclohexane) and 2.3 ml of styrene were added to 30 ml of cyclohexane and the mixture was stirred for 4 hours. Then 1.66 ml of a 1 M solution of triisobutylaluminum in cyclohexane (molar Al/Li ratio=0.85) were added and the solution was stirred at room temperature (25° C.) for a further 4 hours. Glass ampoules were charged with 2.5 ml of this solution and 10 ml of styrene each, fused and stored in a heating bath at 150° C. The ampoules were opened at different times and the polymerization was terminated by adding ethanol. The time/conversion curve obtained was used to calculate a half-life of 1 minute for the styrene conversion at 150° C.

Example 3

Example 2 was repeated, except that 1.86 ml of a 1 M solution of triisobutylaluminum in cyclohexane was used (molar Al/Li ratio=0.95). The half-life at 150° C. was more than 1 hour.

Comparative Experiment 2

0.75 ml of a sec-butyllithium solution (1.3 M in cyclohexane) and 0.6 ml of styrene were added to 200 ml of cyclohexane and stirred for 4 hours. 30 ml of this solution were transferred to a 100 ml flask equipped with a fused-on UV cell. The concentration of the polystyryllithium as determined by UV spectroscopy was [PS-LI]=4.8×10$^{-3}$ M. This solution was mixed with 3.6 ml of a 0.06 M solution of $Et_2AlOEt$ in cyclohexane (molar Al/Li ratio=1.5) and 2.5 ml of styrene. The decrease in the styrene concentration at 100° C. was monitored by UV spectroscopy and analyzed according to a first order rate equation:

$$\ln([\text{styrene}]_0/[\text{styrene}]) = k_a * t$$

A non-linear plot was obtained. The slope of the curve decreased with time. Towards the end of the conversion, the slope $k_a$ was 0.0035 min$^{-1}$. This ka value and the polystyryllithium concentration [PS-Li] gave a reaction rate constant $k_p =_{ka}/[\text{PS-Li}]^{0.5} > 0.05$ M$^{-0.5}$ min$^{-1}$.

Example 4

6.2 ml of a 0.06 M solution of $Et_2AlOEt$ in cyclohexane were added to 30 ml of a solution of polystyryllithium in cyclohexane having a [PS-Li] concentration of 6.2 ×10$^{-3}$ M as determined by UV spectroscopy and stirred at 100° C. for 1h (molar Al/Li ratio=1.5). Further 2.5 ml of styrene were then added. The decrease in styrene concentration at 100° C. was monitored by UV spectroscopy and analyzed as described in Comparative Example 2. The plot of ln ([styrene]$_0$/[styrene]) as a function of time was linear over the whole conversion range. The slope $k_a$ of the straight line was 2.6=10$^{-4}$min$^{-1}$. This $k_a$ value and the (PS-Li] concentration gave a reaction rate constant $k_p$ of 0.0033 M$^{-0.5}$min$^{-1}$.

Example 5

1.2 ml of a sec-butyllithium solution (1.3 M in cyclohexane) and 0.9 ml of dry styrene were added to 200 ml of cyclohexane and stirred for 4 hours.

30 ml of this solution were transferred to a 100 ml flask equipped with a fused-on UV cell. The concentration of the polystyryllithium as determined by UV spectroscopy was [PS-Li]=7.2×10$^{-3}$ M. This solution was mixed with 2.3 ml of a 0.08 M solution of triisobutylaluminum in cyclohexane (molar Al/Li ratio=0.85). The UV-VIS spectrum of the solution was monitored in the UV cell at room temperature.

An absorbence maximum of 287 nm was observed, which grew by 20% over a period of 2 h. After this period, a shoulder at about 330 nm had almost completely disappeared; the corresponding absorbence was reduced to about 64% of the initial value over this period.

Example 6

A 1 l stirred tank equipped with an anchor stirrer was charged with 120 g of styrene and 480 g of toluene under a nitrogen atmosphere and heated to 80° C. with stirring. At the same time, an ampoule containing 10 ml of toluene and 0.5 ml of styrene was charged with 1.51 ml of a 1.6-molar s-butyllithium solution in cyclohexane and, after 10 minutes, with 1.42 ml of a 1.6-molar solution of triisobutylaluminum in toluene. The mixture was kept at 80° C. for 5 minutes and then added to the stirred tank. At a constant temperature of 80° C., the styrene conversion was 14% after 60 minutes, 36% after 115 minutes and 63% after 181 minutes. After 360 minutes, the polymerization was terminated at a conversion of 92% by adding 4 ml of ethanol.

Comparative Experiment 3

A 1 l stirred tank equipped with an anchor stirrer was charged with 120 g of styrene and 480 g of toluene under a nitrogen atmosphere and heated to 60° C. with stirring. On reaching this temperature, 1.51 ml of a 1.6-molar s-butyllithium solution in cyclohexane and 1.42 ml of a 1.6-molar solution of triisobutylaluminum in toluene were added at the same time, but separately. After 3 minutes, the conversion was 51% and the temperature had risen to 77° C. After 5 minutes, the conversion was 61% and the temperature 72° C., and after 40 minutes, the conversion was 83% and the temperature was 60° C.

Example 7

The reactor used for the continuous polymerization was a double-jacketed 2 l stirred tank equipped with a standard anchor stirrer. The reactor was designed for a pressure of 60 bar and was kept at a specified temperature by heat-transfer medium to allow an isothermal polymerization. The initiator components were metered in via a common feed line using a static mixer. The feed line had a capacity of 160 ml, with a section containing 100 ml being kept at 80° C.

The stirred tank was continuously fed with 800 g/h of styrene and, via the common feed line, with a premixed initiator solution comprising 26 ml/h of a 0.16-molar s-butyllithium solution in cyclohexane/toluene (1/9), 24.7 ml/h of a 0.16-molar solution of triisobutylaluminum in toluene, 180 g/h of toluene and 24 g/h of a 10% strength by weight solution of styrene in toluene (molar Li/Al ratio=1/0.92) and stirred (100 revolutions per minute) at a bulk temperature of 104° C. The effluent from the stirred tank was conveyed into a stirred 4 liter tower reactor which was operated at an internal temperature of 109° C. The effluent from the reactor was fed into a second 4 liter tower reactor. To set the temperature, two heating zones of equal length which were arranged in series were used, the internal temperature at the end of the first zone being 140° C., and at the end of the second zone being 158° C. The polymerization mixture was mixed with 20 g/h of a 10% strength by weight solution of methanol in toluene using a mixer at the outlet of the tower reactor, subsequently passed through a tube section heated to 260° C. and released into a vacuum pot kept at 25mbar via a pressure control valve. The melt was discharged via a screw conveyor and pelletized.

A stable equilibrium state was reached in all parts of the unit after a few hours. The pressure drop across the whole unit was 2.2 bar. The solids content was 13.5% by weight at the outlet of the stirred tank and 40.4% by weight at the outlet of the tower reactor. The monomer conversion of the effluent was found to be complete. The polystyrene obtained had a molecular weight Mw of 167,000 g/mol and a polydispersity $M_w/M_n$ of 2.62. The distribution was monomodal. Analysis showed a styrene content of less than 10 ppm, an ethylbenzene content of less than 10 ppm and a toluene content of 92 ppm.

Comparative Experiment 4

Example 7 was repeated, except that 26 ml/h of a 0.16-molar s-butyllithium solution in cyclohexane/toluene (1/9), 24.7 ml/h of a 0.16-molar solution of triisobutylaluminum in toluene and 180g/h of toluene (molar Li/Al ratio=0.95) were metered in via separate feed lines. When attempting to adjust the solids content to 13.5% by weight at the outlet of the stirred tank, the temperature had to be decreased to 83° C. The solids content in the stirred tank varied in the range from 3–25% by weight in the course of several days. The bulk temperature could not be kept constant at 83° C. Samples taken from the stirred tank showed significant variations in molecular weight distribution and sometimes bimodal or multimodal distributions.

Example 8

The initiator components were fed to a thermostatable coil having a length of 4m via a mixing element. The coil had a volume of 12.6 ml and led to the reactor.

The stirred tank from Example 7 was continuously fed with 800 g/h of styrene, 180 g/h of toluene and, via the common feed line, with a premixed initiator solution comprising 23 ml/h of a 0.18-molar s-butyllithium solution in cyclohexane/toluene (1/9) and 44.3 ml/h of a 0.086-molar solution of triisobutylaluminum in toluene (molar Li/Al ratio=1/0.92) and stirred (100 revolutions per minute) at a bulk temperature of 109° C. A constant operational state was reached after only a few hours. The solids content was 14%.

Comparative Experiment 5

Example 8 was repeated, except that the metal alkyls were introduced into the reactor via a feed line with a capacity of only 0.9 ml. The solids content in the reactor rose to 41% within only a few hours. It was found to be difficult to keep the solids content in the stirred tank and the bulk temperature at a constant level.

We claim:

1. A process for the preparation of an initiator composition comprising an alkali metal organyl and an aluminum organyl excluding barium, calcium or strontium, which comprises homogeneously mixing the metal organyls, dissolved in inert hydrocarbons, and aging at a temperature in the range from 0 to 120° C. for at least 2 minutes.

2. A process as claimed in claim 1, wherein the alkali metal organyl used is a lithium organyl.

3. A process as claimed in claim 1, wherein the inert hydrocarbons used are pentane, hexane, heptane, cyclohexane, ethylbenzene or toluene.

4. A process as claimed in claim 1, wherein the concentration of the sum of all metal organyls is in the range from 0.01 to 2 mol/l, based on the initiator composition.

5. A process as claimed in claim 1, wherein the molar ratio of aluminum to alkali metal is in the range from 0.2 to 4.

6. A process as claimed in claim 1, wherein additionally styrene is added before aging to form an oligomeric polystyryl anion in an amount in the range from 10 to 1000 mol %, based on the alkali metal organyl.

7. A process for the polymerization of anionically polymerizable monomers, which comprises preparing an initiator composition by the process of claim 1 and polymerizing anionically polymerizable monomers in the presence of the initiator composition.

8. A process as claimed in claim 7, wherein the anionically polymerizable monomers are styrene.

* * * * *